Aug. 5, 1952           W. B. ZERN           2,605,791
JIG ASSEMBLY AND GUIDE FOR LOCATING DOOR LOCK RECESSES
Filed July 29, 1949           6 Sheets-Sheet 1

*Inventor*
WARREN B. ZERN

By Woodcock and Phelan
ATTORNEYS

Inventor
WARREN B. ZERN
By Woodcock and Phelan
ATTORNEYS

Inventor
WARREN B. ZERN

Aug. 5, 1952 W. B. ZERN 2,605,791
JIG ASSEMBLY AND GUIDE FOR LOCATING DOOR LOCK RECESSES
Filed July 29, 1949 6 Sheets-Sheet 4
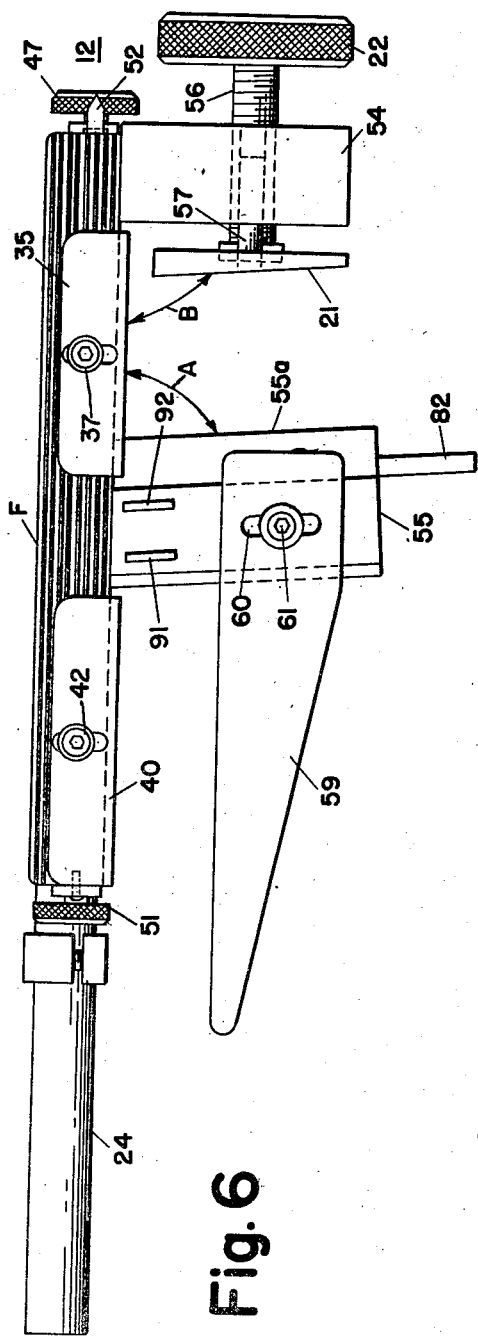
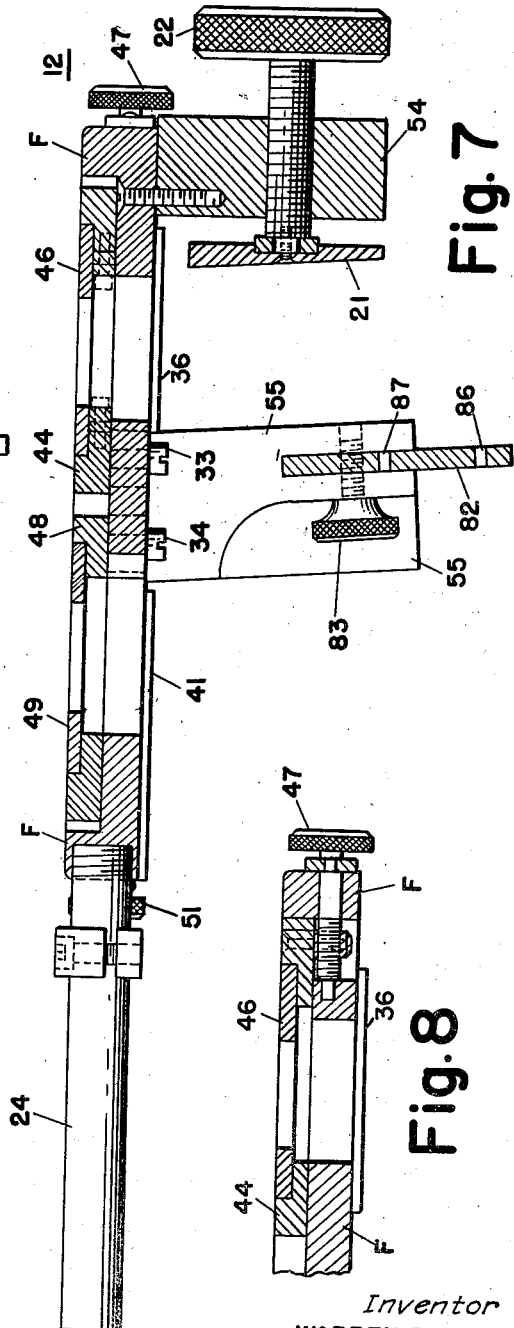
Inventor
WARREN B. ZERN
By Woodcock and Phelan
ATTORNEYS Aug. 5, 1952   W. B. ZERN   2,605,791
JIG ASSEMBLY AND GUIDE FOR LOCATING DOOR LOCK RECESSES
Filed July 29, 1949   6 Sheets-Sheet 5

*Inventor*
WARREN B. ZERN

By Woodcock and Phelan
ATTORNEYS

Aug. 5, 1952 W. B. ZERN 2,605,791
JIG ASSEMBLY AND GUIDE FOR LOCATING DOOR LOCK RECESSES
Filed July 29, 1949 6 Sheets-Sheet 6

INVENTOR.
WARREN B. ZERN
BY
Woodcock and Phelan
ATTORNEYS

Patented Aug. 5, 1952

2,605,791

UNITED STATES PATENT OFFICE 2,605,791

JIG ASSEMBLY AND GUIDE FOR LOCATING DOOR LOCK RECESSES

Warren B. Zern, Montgomery County, near Pottstown, Pa.

Application July 29, 1949, Serial No. 107,428

8 Claims. (Cl. 144—27)

1

This invention relates to lock jig assemblies generally of the type shown in my Patent 2,355,603 and has for an object the provision of an improved apparatus and means quickly and accurately to locate a double template assembly relative to a door and the door jamb for accurately routing the recesses for the door lock and the complementary part or plate on the jamb.

In the past, the use of double template assemblies has been proposed, but one difficulty has been the clamping of the parts into accurate alignment to insure perfect matching after the nailing or securement of the door jamb in the door frame. If an accessory requires as much time in its use as for the work to be done manually, the accessory is of little value to the skilled workman.

In carrying out the present invention in one form thereof, the double template assembly is in its use on the first door accurately positioned for the location of the recess for the lock and the cooperating plate. Thereafter, a non-elastic chain, cable, or the like is secured to the template assembly, pulled taut, and a rod connected to one end thereof. It is then locked or clamped in fixed position with respect to an end-locator assembly secured to the top or head end of the door. Thereafter, the double template assembly is accurately positioned on all subsequent doors by first clamping the end-locating assembly to the end of the door and pulling the template assembly along the door until the chain or cable is taut. The template assembly is then clamped to the door. A clamp carried by the template assembly and end-locator arms carried by the end-locating structure cooperate for the support and accurate positioning of the jamb adjacent the door and beneath the template carried in the template assembly. Thus, my present invention represents a substantial improvement in enabling an operator quickly to rout out the door lock recesses and plate recesses in a multiplicity of doors with minimum delay in setting up the apparatus. Thus, there is a great saving of time and a reduction in the cost of framing or preparing the door for ultimate hanging in the door frame.

Further objects and advantages of the invention will be pointed out in the following description taken in conjunction with the accompanying drawings, in which.

2

Figure 1:
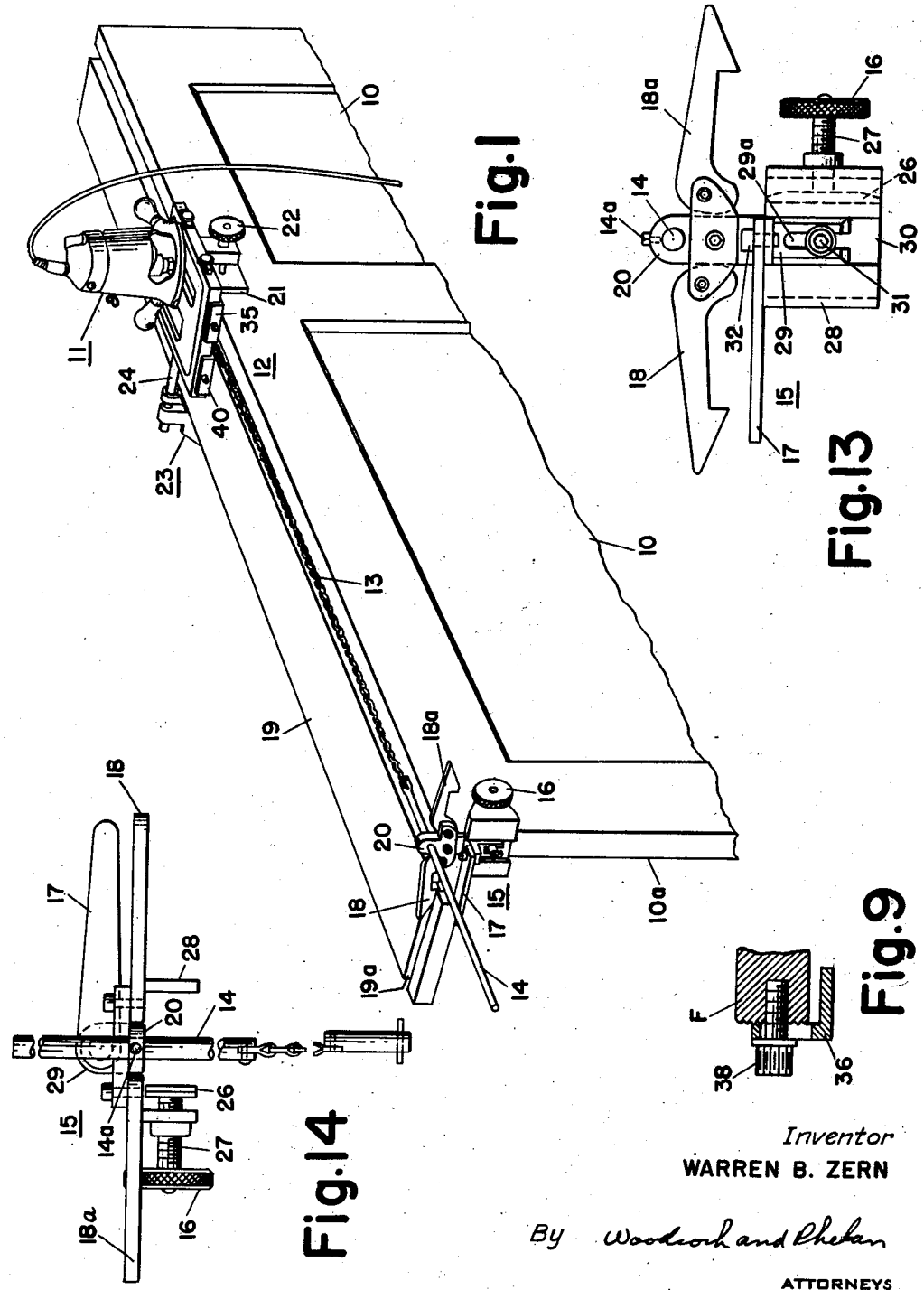
Fig. 1 is an isometric view of a fractional part of the door with the hinge jig assembly in place and the router in position for the routing or cutting of a recess for the lock.
Figure 2:
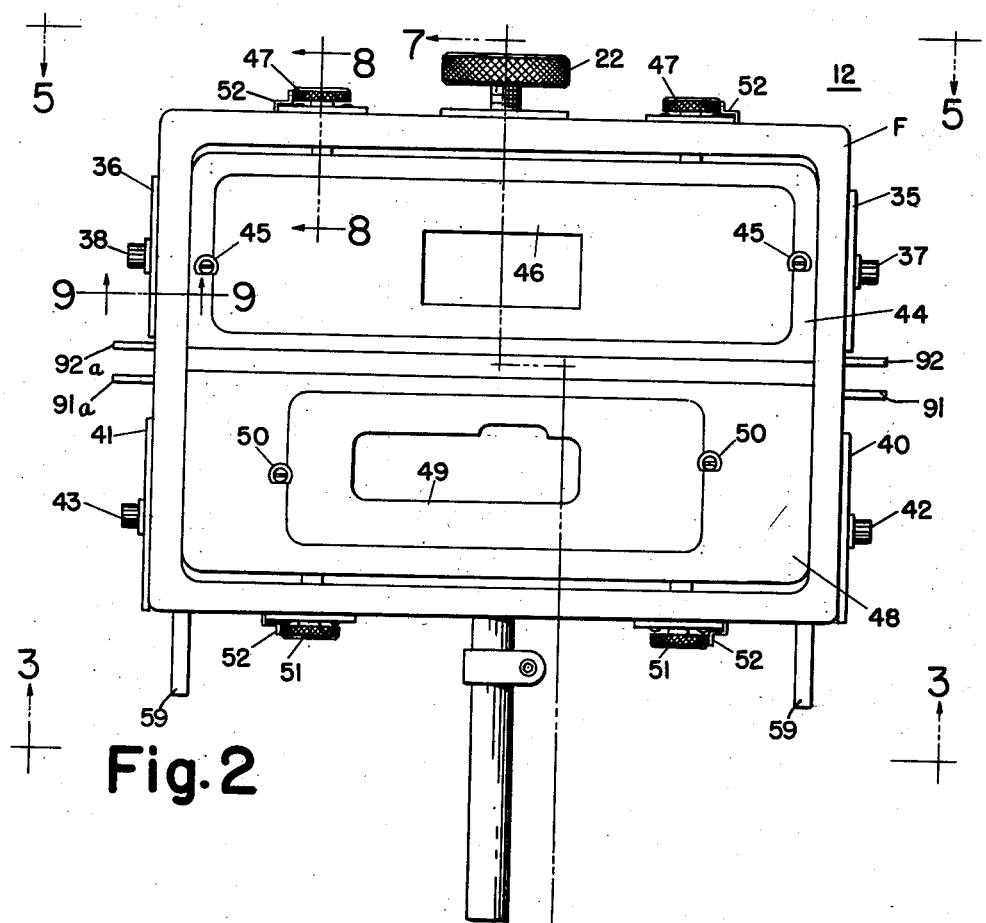
Fig. 2 is a plan view of the double plate assembly.
Figure 3:
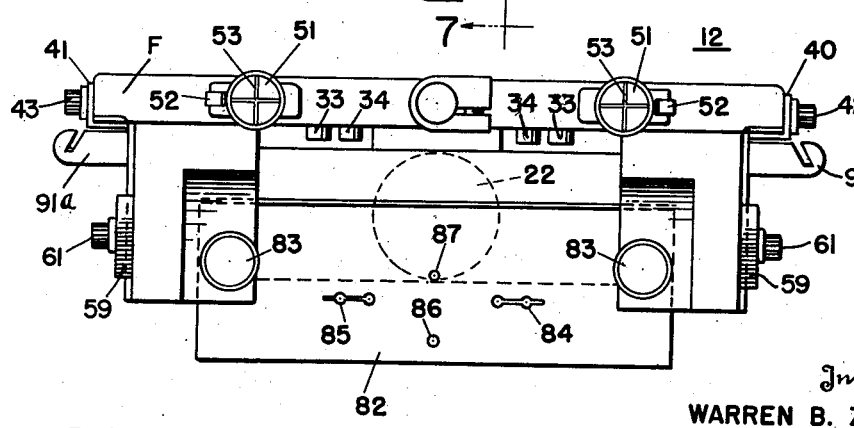
Figure 4:
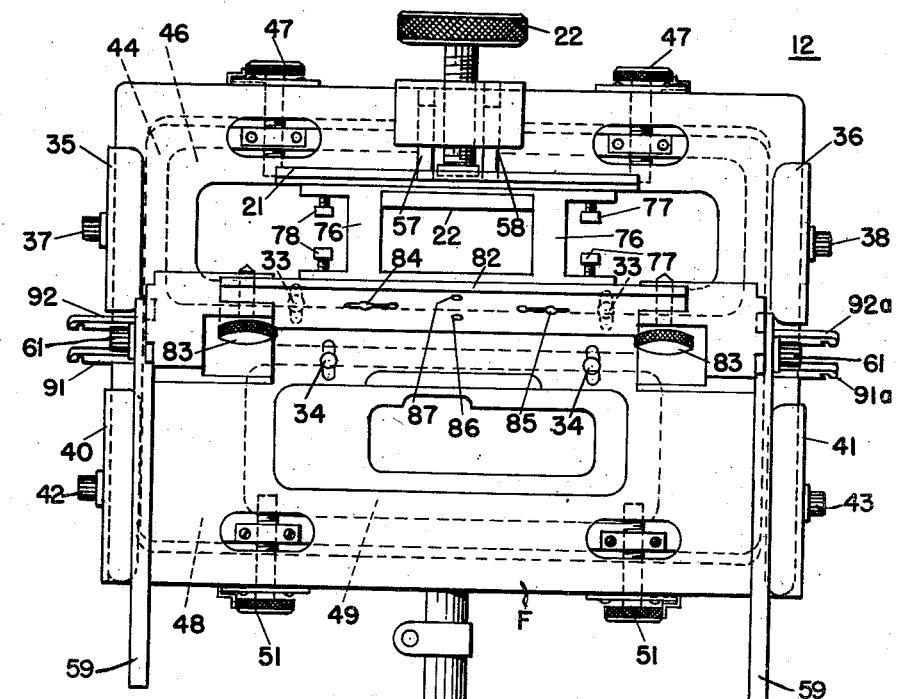
Figure 5:
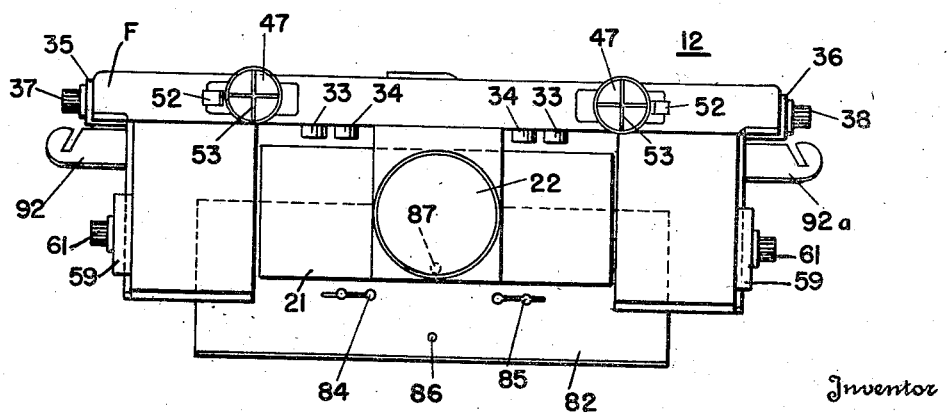
Figure 10:
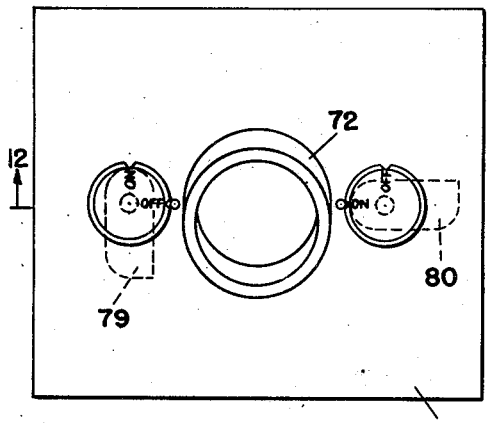
Figure 11:
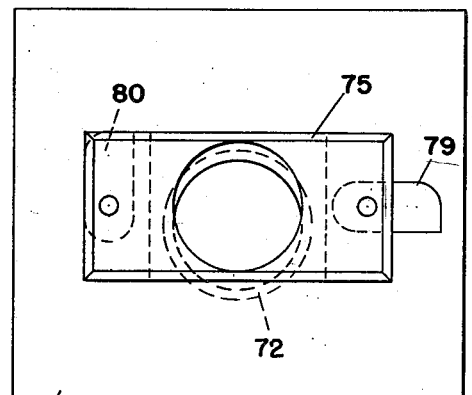
Figure 12:
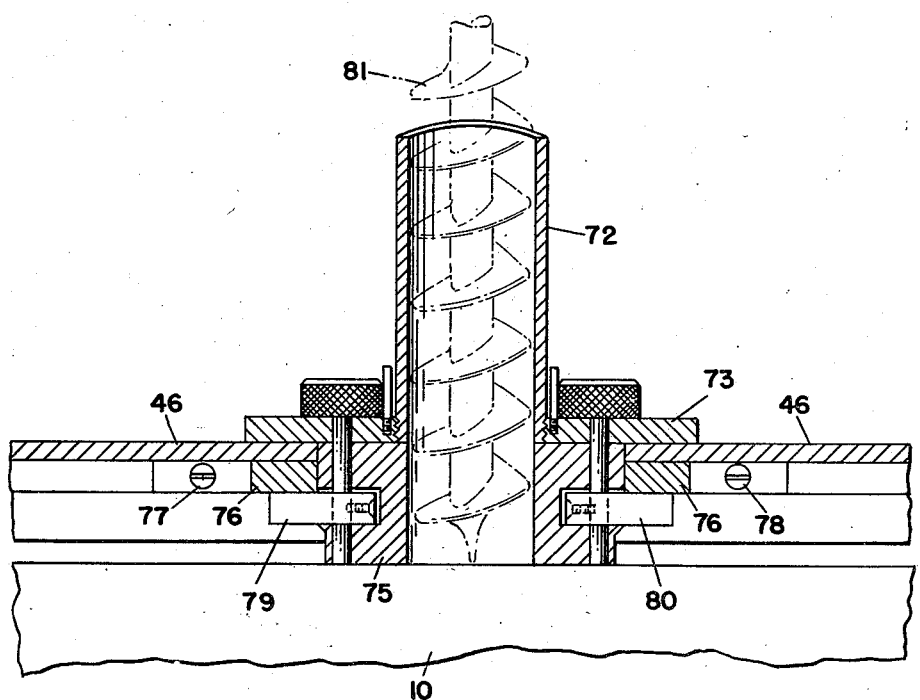
Figure 15:
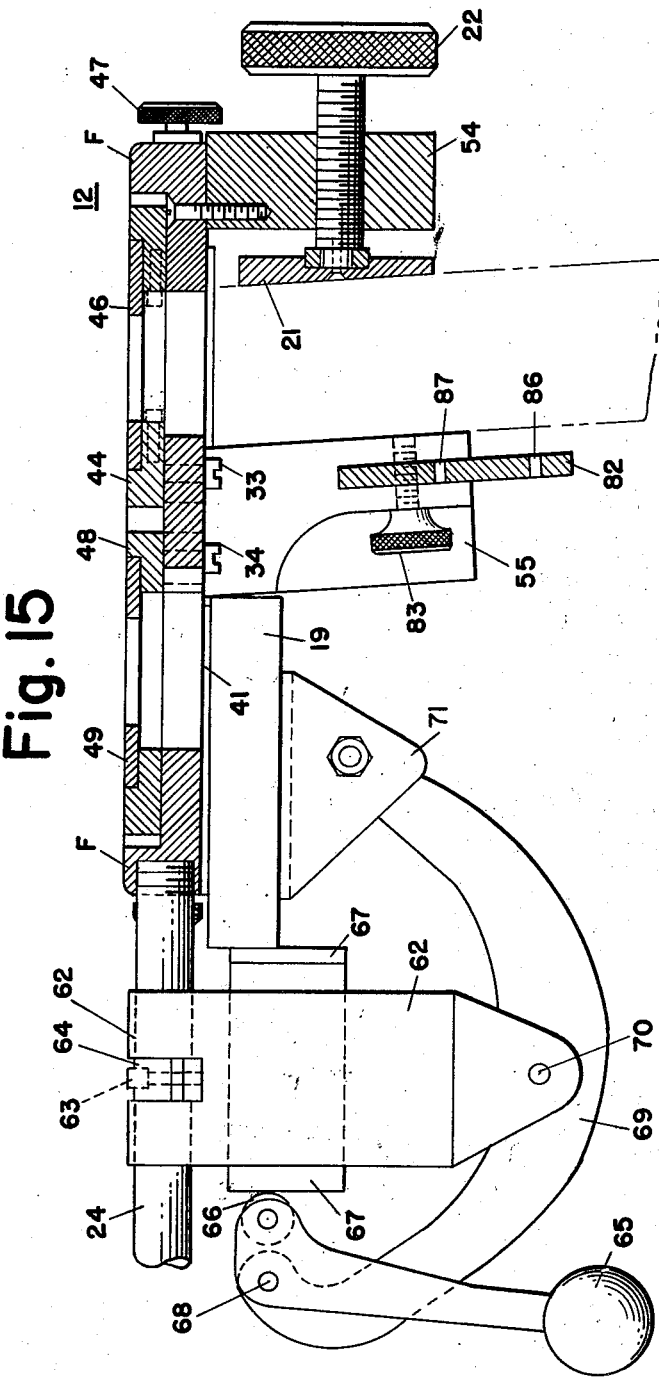
Figure 16:
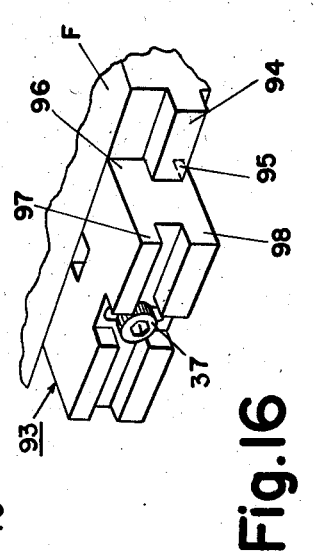

Fig. 3 is a side elevation looking upwardly toward Fig. 2;

Fig. 4 is a bottom plan view of the double template assembly as seen from the bottom or reverse side of Fig. 2;

Fig. 5 is a side elevation looking into Fig. 2 from the upper end thereof;

Fig. 6 is an end elevation looking into Fig. 2 from the right-hand side;

Fig. 7 is a sectional view taken on the line 7—7 of Fig. 2;

Fig. 8 is a fractional sectional elevation taken on the line 8—8 of Fig. 2;

Fig. 9 is a fractional sectional view taken on the line 9—9 of Fig. 2;

Fig. 10 is a plan view of a drill guide for boring the hole for a tubular lock;

Fig. 11 is a bottom plan view of the drill guide;

Fig. 12 is a sectional view of the drill guide taken on the line 12—12 of Fig. 10 and after positioning thereof in the double template assembly;

Fig. 13 (Sheet 1) is an end elevation of the end-locating structure of Fig. 1;

Fig. 14 is a plan view of the end-locating structure of Fig. 1;

Fig. 15 is a sectional view similar to Fig. 7 with a door and a jamb clamped in proper position for the routing of recesses therein; and Fig. 16 is a perspective view of a modification of the depth-control structure shown in Fig. 9.

Referring to the drawings, the invention in one form has been shown as applied to a door 10 supported and held in fixed position along one end thereof by any suitable means (not shown). The lock jig assembly forming the subject matter of the present invention is illustrated in position for the routing of the recess for the lock plate in the door and for the striker plate in the jamb, a router 11 of standard construction being illustrated in position on the double template assembly 12. The double template assembly 12 is located lengthwise of the door in a predetermined position by means of a cable or chain 13 fixedly secured at one end to the double template assembly 12 and at the other end secured to a rod 14 which is clamped in fixed position as by means of a screw 14a to an end-locating assembly 15. The rod 14 may be graduated for different lengths of doors and also provides a convenient handle for pulling the chain 13 taut to insure that the template assembly 12 will be correctly positioned on the rest of the doors in the series. When the routing operations are to be performed on the next door of the same size in a series, there will be no need to change the position of the rod 14 as it has now been clamped in its correct position by means of the screw 14a. The end-locating assembly or structure 15 is clamped firmly and snugly against the head end 10a of the door 10 as by a knob or handle 16. Extending outwardly from the end-locating structure is a jamb-supporting arm 17 and a jamb-locating arm 18. Jamb 19 rests upon the lower arm 17, while the upper locating arm 18 is disposed within a dado or recess 19a in the end of the jamb 19.

While the disposition of the jamb-locating arm 18 in the dado 19a represents the preferred locating means, the shape of the arm 18 may be modified, or the arm as it stands may be utilized in cooperation with the end of the jamb 19 to locate the jamb 19 lengthwise of the door and in suitable position with respect thereto. The double template assembly itself is rigidly clamped to the door 10 by means of a clamping jaw 21 operable by a knob or handle 22, the stationary jaw on opposite sides of the door not appearing in Fig. 1.

A clamping assembly 23 is secured to a supporting rod 24 extending from the template assembly. The clamping assembly 23 includes an arm or jaw, not shown in Fig. 1, which presses the jamb 19 into fixed position with respect to a stationary jaw of the template assembly 12 and preferably includes an arm which simultaneously lifts the jamb 19 against locating surfaces on the lower side of the double template assembly. Thus, it will be seen that in accordance with the present invention the door jamb is simultaneously located lengthwise of the door and in that predetermined relation with a template assembly for the simultaneous or successive routing of a recess for the striker plate in the jamb and for the lock plate in the door.

As best shown in Figs. 13 and 14, the end-locating structure 15 may include a jaw 26 pivotally carried at the end of the threaded shank 27 to which the knob 16 is secured. A stationary arm 28 engages one side of the door while the jaw 26 engages the opposite side of the door to provide a structure for the clamping operation. The jamb-locating arm 18 is carried by an extension 20 on the frame. A second jamb-locating arm 18a is provided and, it will be observed, it extends outwardly from the opposite side of the end-locating structure 15 and is used to take care of doors which swing from the opposite side to the one illustrated in Fig. 1. This feature of the invention will later be described more in detail.

The lower supporting arm 17 is pivotally secured to a ledge on the bracket 29 as by a screw 32, Fig. 13, the arm being pivotally mounted for rotation from its left-hand position in Fig. 1 to a right-hand position in cooperative relation with the arm 18a. The bracket 29 is slidably mounted in a way or groove 30 and clamped therein by a screw 31. Thus, the slot 29a provides for vertical adjustment of the lower supporting arm 17 to take care of jambs of differing thickness.

In general, the thickness of the lock plates and the striker plates will be different from the thickness of the hinges. However, in order that the router 11 may be used with the same setting for both the hinge seats and for the seats for the lock plates and striker plates, provision is made for separate adjustment of the locator surfaces on the double template assembly 12, for the door 10 and for the jamb 19. More particularly, the depth-control structure which determines the depth of the recess for the lock plate of the door comprises adjustable angles 35 and 36, at least one being shown in Figs. 1, 2, 4, 5, 6, 7, 8 and 9, each provided with a slot and a serrated edge for complementary engagement with the serrated edge provided on the frame F of the template assembly, knurled headed locking screws 37 and 38 serving to hold the angles in fixed relation against the frame.

As best shown in Fig. 9, it will be observed the spacing of the lower half of each angle, specifically the angle 36, may be varied relative to the frame to raise and lower the double template assembly as a whole in control of the depth of the cut of the router for a fixed adjustment thereof. In one preferred form of the invention, the distance between the crests and the distance between the troughs of the notched frame and angles may be one-sixteenth inch. Thus, each adjustment will result in the change of depth by one-sixteenth inch. Of course, the serrations or notches may be but a thirty-second of an inch between notches if a finer adjustment is desired.

By providing separate depth-control angles 40 and 41, Figs. 1-4, each adjustable under the control of the knurled headed screws 42 and 43, the position of the jamb 19 relative to the template or the striker plate may be varied as desired. Thus, variations in thickness as between the lock plates and striker plates can be taken into account by the proper adjustment of the depth-control angles 36—36 and 40—41.

The double template assembly 12 is constructed for maximum flexibility in the operations performed therewith as by the provisions of a number of adjustable features. More particularly, referring to Figs. 2-5, it will be seen that there is mounted within the frame F a template carrier 44 which has secured thereto as by the screws 45, the template 46 for the lock plate. The template carrier 44 is slidable upon the ways formed in the frame F. The screws in threaded engagement with the carrier 44, Figs. 4 and 8, may be rotated by the knurled knobs 47, secured to the screws to position the carrier 44 and the template 46 in any desired position as may be required by the thickness of the particular door to which the assembly as a whole is secured.

Similarly, a carrier 48, slidably mounted upon ways in the frame F, has secured to it the template 49 as by the clamping screws 50. Its position within the frame F is under the control of screws in threaded engagement with the carrier 48 and operable by the knurled heads or knobs 51. Clamping screws 33 and 34 are provided on the underside of the assembly 12 to hold each carrier in fixed position, and frictional arms may also bear against the knurled heads of the adjusting knobs 47 and 51 to hold them in fixed position while screws 33 and 34 are being tightened, such arms being shown in Figs. 2, 3 and 5 and identified by the reference character 52. Preferably, each knurled end or head of each screw is provided with a marking such as the diametral lines 53, Figs. 3 and 5, so that an operator may count the number of turns or the number of quarter turns of each screw, the threads being cut for a movement of each carrier by a fixed amount for each quarter of revolution. The quarter revolution calibration is to be taken as suggestive, the point being that it is desirable that for each quarter turn the carrier shall be moved, say, a sixty-fourth of an inch. For lock plates and striker plates of different sizes, different templates can be readily inserted into each carrier, as may be required.

Referring now to Figs. 6, 7 and 8, it will be seen that the frame F is provided with downwardly extending arms or projections 54 and 55, the former having extending therethrough the threaded screw 56 to which is attached the clamping knob 22. Retained at the inner end of the screw 56 is the clamping plate 21 which is guided in its movement into and out of the clamping position by means of rods 57 and 58, both of them appearing in Fig. 4. As already explained, the door extends into the space between the locating surface 55a of projection 55 and the clamping member 21. It will be observed that the locating surface 55a of the projection 55 and the cooperating clamping surface of clamping member 21 extend at an angle with respect to the upper template-carrying portion of the frame, this angle being approximately 3½° less than a right angle in the case of angle A bounded on one side by surface 55a and approximately 3½° more than a right angle in the case of angle B bounded on one side by the opposed parallel clamping surface of member 21. The angular relation between the locating surface 55a, Fig. 6, and the locating surfaces 35 (and 36, Fig. 2) is to take care of the fact that many doors are provided with angular edges; i. e., an edge which is disposed or cut at an angle with respect to the face of the door, such angle ordinarily being of the order of 3½° from the usual 90° relation of the edge and face of a square edge door. Thus, for an angularly edged door the lower face of the locating angles 35 and 36 will rest against the edge of the door while for a square edged door the template-carrying portion of the frame will be disposed at a 3½° angle with respect to the edge of the door.

By reason of the foregoing provisions, the seats routed beneath each opening in each template will be of proper depth and relation to the edge of the door to take into account and to make uniform the location of each plate regardless of whether the operation is being carried out on a square edged door or one with angular edges.

Secured to the projection 55 of frame F is a pair of adjustable jamb-supporting arms 59, Figs. 2–5, each provided with a slot 60 and a locking screw 61, Fig. 6, the jamb-supporting arms 59 cooperating with jamb-supporting arm 17, Fig. 1, of the end-locating structure temporarily to support the jamb 19 preparatory to the routing of the seat for the striker plate therein. After the jamb has been located on the arms 17 and 59, a clamp, Fig. 15, rotatably supported on an extension 24 of the frame F is operated to clamp the jamb firmly against the frame extension 55. While any suitable form of clamp may be utilized, I prefer a clamp of the type shown in Schwarzer application Serial No. 106,836, filed July 26, 1949 and assigned to me.

The preferred form of clamp illustrated herein, Fig. 15, forms a part of the subject matter of said Schwarzer application. Preferably it functions as follows: The clamp frame 62 is fixed in position on the rod-like extension 24 by means of a screw 63 extending through a locating collar 64. By rotating an operating handle 65 in a counterclockwise direction from an elevated position, a cam surface 66 is brought to bear against the end of a slidable jaw 67. The operating lever 65 is pivoted at 68 to a crank 69 pivotally supported at 70 to the clamp frame 62 and carrying a pressure foot 71 pivoted at the opposite end thereof. The downward movement of the operating lever 65 rotates the crank 69 in a counterclockwise direction to elevate the pressure foot 71, first to lift the jamb 19 upwardly against the locating surfaces of angles 40 and 41. After the elevation of the jamb 19 against the locating surfaces, the crank 69, of course, comes to standstill. Thereafter the cam surface 66 is effective to move the slidable jaw 67 to the right to press the jamb tightly against the projection 55.

After the routing of the seats for the plates, it is desirable immediately to bore the opening for the tubular lock usually used on doors. This is readily accomplished with the opening for the tubular lock precisely located by the template for the lock plate in manner which will now be described in connection with Figs. 10–12.

The drill guide comprises a cylindrical riser 72 extending upwardly from a plate 73 at an angle which is 3½° away from a right angle, this angle being indicated in Fig. 10. Secured to the plate 73 is a body portion 75, Figs. 11 and 12, which is made to nest within the opening in the template 46, Fig. 12. In order to hold the drill guide in place without application of stress to the template 46, there is provided a supporting frame 76, the shape of which is best seen in Fig. 4. Screws 77 and 78 secure the subframe 76 to the template carrier 44. Upon insertion of the drill guide into the plate 46, Fig. 12, the body portion 75 moves through the opening until a pair of locking dogs 79 and 80 may be moved outwardly from slots in the body 75 into locking engagement with the cross members of subframe 76. With the drill guide so locked in position, the drill 81, shown in broken lines in Fig. 12, may be lowered through the drill guide and the hole drilled into the door for the tubular lock of the door. With the drill guide thus clamped in position, it is to be understood that the inclined tubular guide extends at an angle of 93½° from the face of the template and, thus, the opening for the tubular lock will extend parallel to the face of the door and maximum strength for the mounting of the lock within the door will then be provided.

There have now been described the principal operations of the lock jig forming the subject matter of the present invention though it is to be understood that further variations will suggest themselves to those skilled in the art. For example, an additional feature may include the provision of a marker plate 82, Figs. 3, 4 and 5, which may be inserted into a notched end of the projections 55 of the frame F, Figs. 3 and 7, and there held in position by screws operable by knurled knobs 83. The markerplate 82 is then positioned so that the openings 84 and 85 may be used to inscribe on the door marks for the keyhole and spindle openings of the mortise type of lock. The openings 86 and 87 correspond to the standard locations for most tubular lock spindles. It is obvious that further openings can be made in the template for marking spindle locations of special locks that do not conform to the more popular type of lock in use on doors. Thus, the spindle template 82 is but a further example of additional uses and advantages of the present invention.

Now that the door has been prepared for the application of the lock thereto, the lock jig assembly as a whole is readily removable therefrom. The clamping assembly is released, the jamb removed, and the end-locator mechanism 15 released by the clamp 16. It is here to be noted that the clamping assembly may be released and the jamb removed prior to the marking of the location for the lock spindle on the door, if it is so desired. However, care should be taken during this operation so that the lock jig will not be loosened on the door. The end of the chain may then be unhooked from the bayonet slots provided in the ends 91 and 92 of a bifurcated yoke at one end of the frame F. Similar ends 91a and 92a are provided at the opposite end of the frame F, Figs. 2 and 4, for use of the lock jig assembly for both right-hand and left-hand doors.

To cut recesses in a door which swings from the opposite side to the one illustrated in Fig. 1, the door shown therein will be turned end for end so that the head end 10a of the door 10 will be to the opposite side of the router 11, and the lower longitudinal edge of the door will now be in the upper position for the cutting of the lock recess therein. The template assembly 12 will remain in a position similar to the one shown in Fig. 1 with the knob 22 to the right of the door. The jamb will continue to be positioned on the same side of the door as that shown in Fig. 1; however, it will also be turned end for end so the dado therein will be adjacent the head end of the door. As the head ends of the door and the jamb will now be at the opposite end to that shown in Fig. 1, it becomes necessary to move the end-locating assembly 15 to the opposite end also. When the assembly 15 is clamped to the opposite end of the door, the knob or handle 16 will be located on the opposite side of the door with respect to knob 22 of the template assembly. Then all that will be necessary to adjust the end-locating assembly 15 is to rotate the jamb-supporting arm 17 from left to right through an angle of 180° to a position in cooperative relation with the jamb-locating arm 18a. The lock jig assembly will then be ready for operation as described above.

In accordance with a further modification of the invention, the locator angles 35, 36, 40 and 41 may be replaced by four blocks, one of which, the block 93, is illustrated in Fig. 16. In this modification it will be observed there is a ledge 94 provided in the frame F and that each block is provided with complementary recesses to form four flanges 95—98, each of differing thickness. Thus, as shown in Fig. 16, the flange 95, of minimum thickness, is disposed below the lower face of the frame F and serves as a locating surface for the maximum depth of the lock plate seat, maximum because the door is then permitted to be nearer the template, and the router tool will extend further therethrough. If now the block 93 be turned over end for end, it will be seen that the flange 96, of maximum depth, will be moved to extend below the surface of the frame F, thus providing for the routing of a seat of minimum depth.

If now the block 93 is reversed in position so that the flange 97 extends below the lower face of the frame F, a seat of intermediate depth may be cut and if again turned end for end, a further seat of another intermediate depth may be cut. The four flanges may be of such thickness as to provide for the routing of recesses of one-sixteenth, one eighth, three-sixteenths and one-quarter inch in depth. In general, it has been found that the novel arrangement of the blocks and the differing depth or thicknesses of the flanges therein has minimized errors incident to the use of the serrated angles of Figs. 1-9.

While there has been described a preferred embodiment of the invention, it will be understood that further modifications may be made without departing from the spirit and scope of the invention as set forth in the appended claims.

What is claimed is:

1. A lock jig assembly comprising end-locating structure including a clamp for securing the structure to the end of a door in predetermined position, said structure including an arm for supporting a door jamb adjacent said door, a jamb-locating projection secured to said structure and engaging the jamb accurately to position it lengthwise of the door, a double template assembly, one template being for the lock on the door and the other being for the complementary part on the jamb, an adjustable connecting means between the end-locating structure and said template assembly for determining the distance therebetween for rapid cutting in the door and in the jamb of recesses for the door lock and the complementary part, said template assembly including a jamb support extending outwardly of the door, said assembly having separate locating surfaces one for the door and one for the jamb for selective positioning thereof with respect to each template therefor, said template assembly including a clamp having at least one arm for pressing the jamb into fixed position relative to its locating surface while held in fixed position lengthwise of said door by said jamb-locating projection, and separate clamping means on said assembly for clamping said door in fixed position relative to its locating surface.

2. The combination set forth in claim 1 in which said connecting means between said end-locating structure and said template assembly structure comprises a rod graduated for different lengths of doors and a chain extending between the ends of said rod and said template assembly, and means carried by said structure for clamping said rod in fixed positions for location of the template assembly relative to the end-locating structure.

3. The combination set forth in claim 1 in which said jamb-supporting arm is pivotally mounted for movement through 180° and in which said structure includes a second jamb-locating arm, both provisions coacting for location of the template assembly located from the opposite end of said door.

4. The combination set forth in claim 1 in which said locating surfaces for the door and jamb comprise blocks having flanges of differing thickness which may be selectively disposed below the frame for selective routing of plate seats of differing depth, and means for holding each block in fixed position on said frame.

5. The combination with a template frame for routing recesses, said frame having a supporting ledge extending therefrom of depth-locating blocks each having a pair of recesses extending lengthwise thereof and displaced one from the other to provide four flanges of differing thickness, and means for clamping said block to said frame with a selected flange extending below the template frame to establish a predetermined depth of routing.

6. A lock jig assembly comprising end-locating structure including a clamp for securing the structure to the end of a door in predetermined position, said structure including an arm rotatable through 180° for supporting a door jamb adjacent said door, jamb-locating arms pivoted to said structure and rotatable into engagement with the jamb accurately to position it lengthwise of the door, a double template assembly, one template being for the lock on the door and the other being for the plate on the jamb, an adjustable connection between the end-locating structure and said template assembly for determining the distance therebetween for rapid cutting in the door and in the jamb of recesses for a door lock and a plate, said template assembly including a jamb support extending outwardly of the door, said assembly having separate locating surfaces, one for the door and one for the jamb for selective positioning thereof with respect to each template thereof, said template assembly including a clamp having at least one arm for lifting the jamb against its locating surface and for pressing it into fixed position relative thereto while held in fixed position lengthwise of said door by one of said jamb-locating arms, and separate clamping means on said assembly for clamping said door in fixed position relative to its locating surface.

7. The combination of a template assembly comprising a frame having opposed clamping members the clamping surfaces of which are parallel to each other for clamping a member therebetween, a template carrier supported within said frame, a sub-frame secured to said template carrier, a template carried by said carrier, said template having a central opening and a drill guide adapted for insertion within the opening of said template for establishing the direction of the drill comprising a cylindrical riser extending at the same angle as said clamping surfaces, a body portion secured to said riser dimensioned to nest within the opening in said template, and interlocking means carried by said drill guide for locking said guide to said sub-frame in a predetermined fixed position without application of stress to said template for the drilling of an opening parallel to the member clamped between said clamping members.

8. The combination with a template frame, a template supported therein, said template having a central opening and said template frame having opposed clamping members, the clamping surfaces of which are parallel and with respect to the template face one of said surfaces being disposed at an angle somewhat greater than 90° and the opposed surface being disposed at an angle somewhat less than 90°, of a drill guide having a tubular riser adapted for insertion in the opening of said template for establishing the direction of the drill, said tubular riser extending at an angle with respect to said template face and parallel to said clamping surfaces, and interlocking members carried by said drill guide for releasably locking said drill guide to said template frame in a predetermined fixed position for the drilling of an opening in a member clamped between said clamping members and parallel thereto.

WARREN B. ZERN.

REFERENCES CITED

The following references are of record in the file of this patent:

UNITED STATES PATENTS

| Number | Name | Date |
|---|---|---|
| 660,012 | Harling | Oct. 16, 1900 |
| 761,861 | Wagner | June 7, 1904 |
| 971,627 | Nicholls | Oct. 4, 1910 |
| 1,879,454 | Parker | Sept. 27, 1932 |
| 2,355,603 | Zern | Aug. 8, 1944 |